(12) United States Patent
Chang

(10) Patent No.: US 7,515,229 B2
(45) Date of Patent: Apr. 7, 2009

(54) DIRECT TYPE BACKLIGHT MODULE AND LIQUID CRYSTAL DISPLAY USING SAME

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 232 days.

(21) Appl. No.: 11/478,413

(22) Filed: Jun. 28, 2006

(65) Prior Publication Data
US 2007/0030414 A1    Feb. 8, 2007

(30) Foreign Application Priority Data
Aug. 5, 2005    (CN) .................. 2005 1 0036429

(51) Int. Cl.
*G02F 1/1335*    (2006.01)
*F21V 7/04*    (2006.01)
(52) U.S. Cl. ...................... 349/114; 362/606
(58) Field of Classification Search ............... None
See application file for complete search history.

(56) References Cited

U.S. PATENT DOCUMENTS

| 6,561,663 B2 * | 5/2003 | Adachi et al. ............. 362/616 |
| 6,867,829 B2 | 3/2005 | Chiou |
| 2005/0088593 A1 * | 4/2005 | Yamauchi ................ 349/114 |
| 2005/0201077 A1 * | 9/2005 | Tsai ............................ 362/26 |
| 2007/0047228 A1 * | 3/2007 | Thompson et al. .......... 362/237 |
| 2007/0133097 A1 * | 6/2007 | Lubart et al. ............... 359/641 |

FOREIGN PATENT DOCUMENTS

| CN | 2604706 Y | 2/2004 |
| JP | 2002-298629 A | 10/2002 |

* cited by examiner

*Primary Examiner*—Michelle R. Connelly-Cushwa
*Assistant Examiner*—Chris Chu
(74) *Attorney, Agent, or Firm*—Andrew C. Cheng

(57) ABSTRACT

A direct type backlight module (1) includes at least one light source (11) for emitting light beams, and a light guide plate (12) having a first surface (13), an opposite second surface (14), and at least one transflective unit (16) arranged on the first surface adjacent to the corresponding at least one light source. The at least one transflective unit is configured for reflecting a first part of the incident light beams, and allowing a second part of the incident light beams to pass therethrough. The present backlight module has a high level of brightness uniformity.

20 Claims, 9 Drawing Sheets

DIRECT TYPE BACKLIGHT MODULE AND LIQUID CRYSTAL DISPLAY USING SAME

TECHNICAL FIELD

The present invention relates to a backlight module and, more particularly, to a direct type backlight module and a liquid crystal display having the same.

BACKGROUND

Nowadays, liquid crystal materials are widely utilized in various liquid crystal displays having different sizes for different applications, such as TVs, liquid crystal projectors, mobile telephones, personal digital assistants (PDA), etc. Because liquid crystal itself cannot emit light, light sources must be utilized to illuminate liquid crystal for image display. The light sources are called backlight sources since they are usually configured behind liquid crystal panels. A combination of all components behind the liquid crystal panels, including the light sources, is generally referred to as a backlight module. Usually, the backlight modules can be classified into edge type backlight modules and direct type backlight modules.

A typical direct type backlight device includes a light guide plate and a plurality of light sources arranged behind the light guide plate. Because the plurality of light sources are arranged behind the light guide plate, the regions of the light guide plate adjacent to the light sources are brighter than those further away from the light sources. Thus brightness uniformity of the direct type backlight device is impaired. One method for solving this problem includes adding an amount of light sources, but this will produce new problems, such as high cost and over-heating. It cannot satisfy needs of the high quality of direct type backlight devices and liquid crystal displays.

What is needed, therefore, is a direct type backlight module with high brightness uniformity and a corresponding liquid crystal display.

SUMMARY

A direct type backlight module according to one preferred embodiment includes at least one light source for emitting light beams, and a light guide plate having a first surface, an opposite second surface and at least one transflective unit arranged on the first surface adjacent to the corresponding at least one light source. The at least one transflective unit is configured for reflecting a first part of the incident light beams, and allowing a second part of the incident light beams to pass therethrough.

A liquid crystal display according to another preferred embodiment includes a liquid crystal display panel, and a direct type backlight module arranged adjacent to the liquid crystal panel. The direct type backlight module includes at least one light source for emitting light beams, and a light guide plate having a first surface, an opposite second surface and at least one transflective unit arranged on the first surface adjacent to the corresponding at least one light source. The at least one transflective unit is configured for reflecting a first part of the light beams incident thereon, and allowing a second part of the light beams incident thereon to pass therethrough.

Comparing with conventional direct type backlight module, the present backlight module has several advantages. As at least one transflective unit is used, incident light beams can be split up into first and second parts, with the first part being reflected away to be emitted from another part of the guide plate and the second part being directly transmitted. That is, the transflective unit weakens the brightness of the regions of the light guide plate adjacent to the light source relative to the rest of the light guide plate. Therefore, the present backlight module has a high level of brightness uniformity.

Other advantages and novel features will become more apparent from the following detailed description of present display device, when taken in conjunction with the accompanying drawings.

BRIEF DESCRIPTION OF THE DRAWINGS

Many aspects of the present direct type backlight module can be better understood with reference to the following drawings. The components in the drawings are not necessarily drawn to scale, the emphasis instead being placed upon clearly illustrating the principles of the present direct type backlight module. Moreover, in the drawings, like reference numerals designate corresponding parts throughout the several views.

DETAILED DESCRIPTION OF PREFERRED EMBODIMENTS

Reference will now be made to the drawings to describe a preferred embodiment of the present direct type backlight module and liquid crystal display, in detail.

Figure 1:
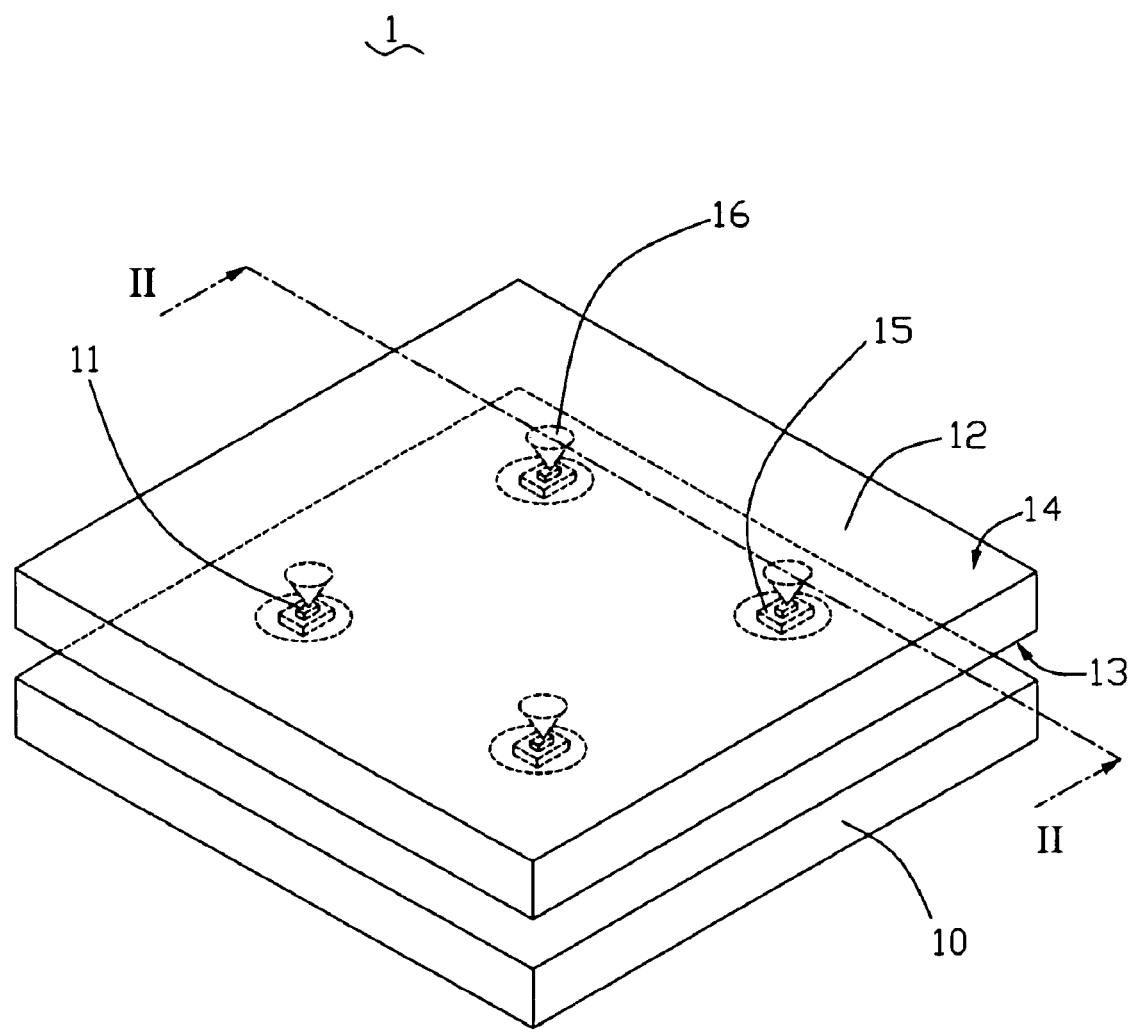
FIG. 1 is an isometric view of a direct type backlight module in accordance with a first preferred embodiment.
Figure 2:
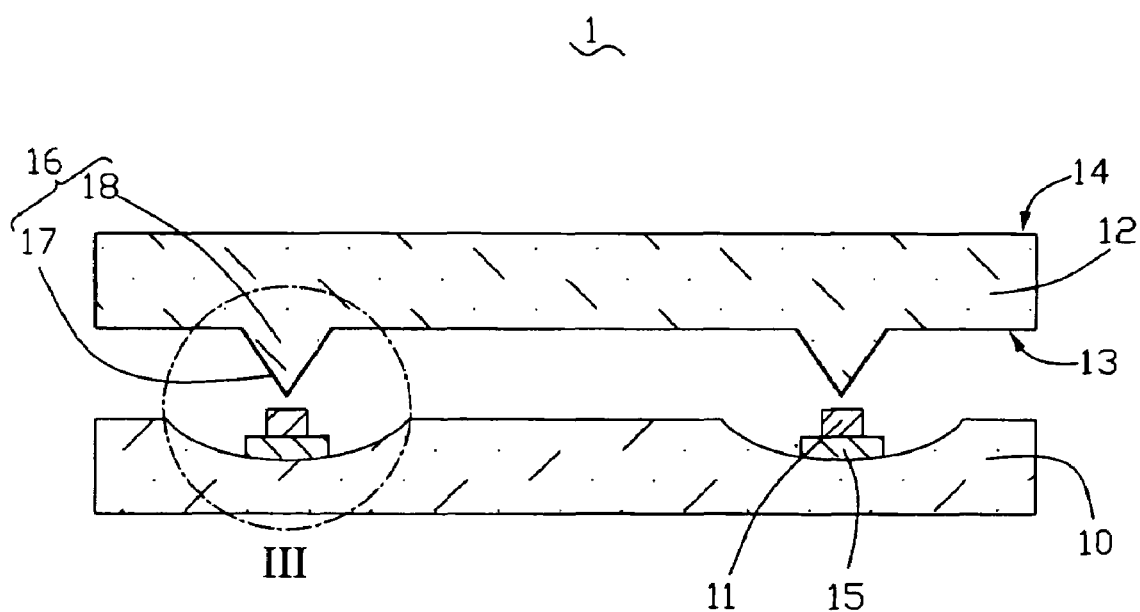
FIG. 2 is a schematic, cross-sectional view of the direct type backlight module taken along line II-II of FIG. 1.
Figure 3:
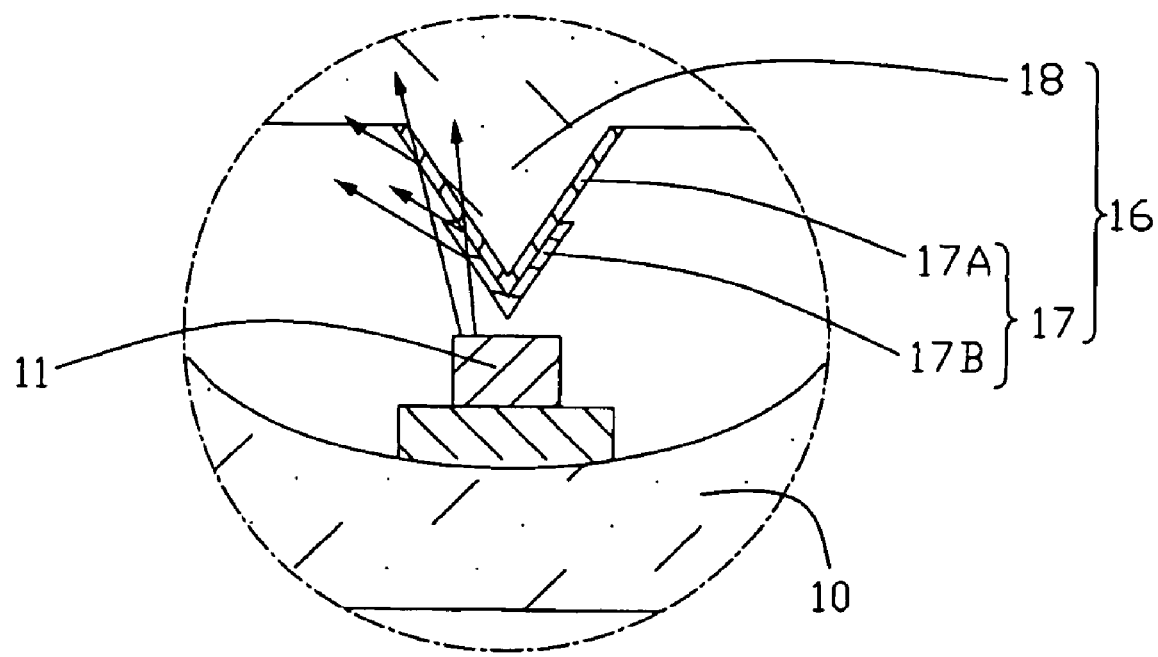
FIG. 3 is a schematic, enlarged view of a circled region III of the direct type backlight module of FIG. 2.

Referring to FIGS. 1 to 3, a direct type backlight module 1, in accordance with a first preferred embodiment, is shown. The direct type backlight module 1 includes at least one light source 11 and a light guide plate 12 having a first surface 13 and an opposite second surface 14. The light guide plate 12 further includes at least one transflective unit 16 arranged on the first surface 13, and the at least one transflective unit 16 is positioned spatially corresponding to the at least one light source 11. In this embodiment, the first surface 13 is a light incident surface where light beams emitted form the light source 11 enter the light guide plate 12, and the second surface 14 is a light emitting surface where light beams exit from the light guide source 11.

The direct type backlight module 1 further includes a reflection plate 10 configured for reflecting the light beams from the at least one light source 11 to the light guide plate 12. The at least one light source 11 is mounted on the reflection plate 10 through corresponding light source base 15. In this embodiment, the at least one light source 11 is for example a light emitting diode. The light source base 15 is made of a material with insulating and thermal properties.

The light guide plate 12 is utilized to diffuse the light beams coming from the at least one light source 11 and the light beams reflected by the reflection plate 10. The light guide plate is made of polycarbonate (PC) or polymethyl methacrylate (PMMA). In the present embodiment, the at least one transflective unit 16 is formed on the first surface 13 of the light guide plate 12. Each transflective unit 16 includes a block 18 extending from the light guide plate 12. The block 18 may have a tapered surface or a semispherical surface. In this embodiment, the block 18 may have a tapered surface, the tapered surface tapering in a direction toward the corresponding at least one light source 11.

Each transflective unit 16 includes at least one transflective layer 17 coated on the block 18 configured for reflecting the first part of the light beams emitted from the light source, and allowing the second part of the light beams emitted from the light source to pass therethrough. The at least one transflective layer 17 has a reflective capability which gradually decreases in a direction away from the light source 11. The transflective layer 17 is made of a material selected from a group of magnesium fluoride ($MgF_2$), titanium dioxide ($TiO_2$), tantalum oxide ($Ta_2O_5$), or silicon dioxide ($SiO_2$). In this embodiment, a first transflective layer 17A and a second transflective layer 17B applied onto the transflective unit 16. The first transflective layer 17A covers block 18, and the second transflective layer 17B partially covers the first transflective layer 17A. The second transflective layer 17B covers part of the first transflective layer 17A adjacent to the light source 11. The transflective layer 17 transmits the second part of light beams emitted from the light source 11 and reflects the first part of light beams emitted from the light source 11.

Compared to the conventional direct type backlight module, the present direct type backlight module 1 has following advantages. As at least one transflective unit 16 is used, incident light beams can be split up into first and second parts, with the first part being reflected away to be emitted from another part of the light guide plate 12 and the second part being directly transmitted. That is, the transflective unit 16 weakens the brightness of the regions of the light guide plate 12 adjacent to the light source 11 relative to the rest of the light guide plate 12. Therefore, the present backlight module 1 has a high level of brightness uniformity.

Figure 4:
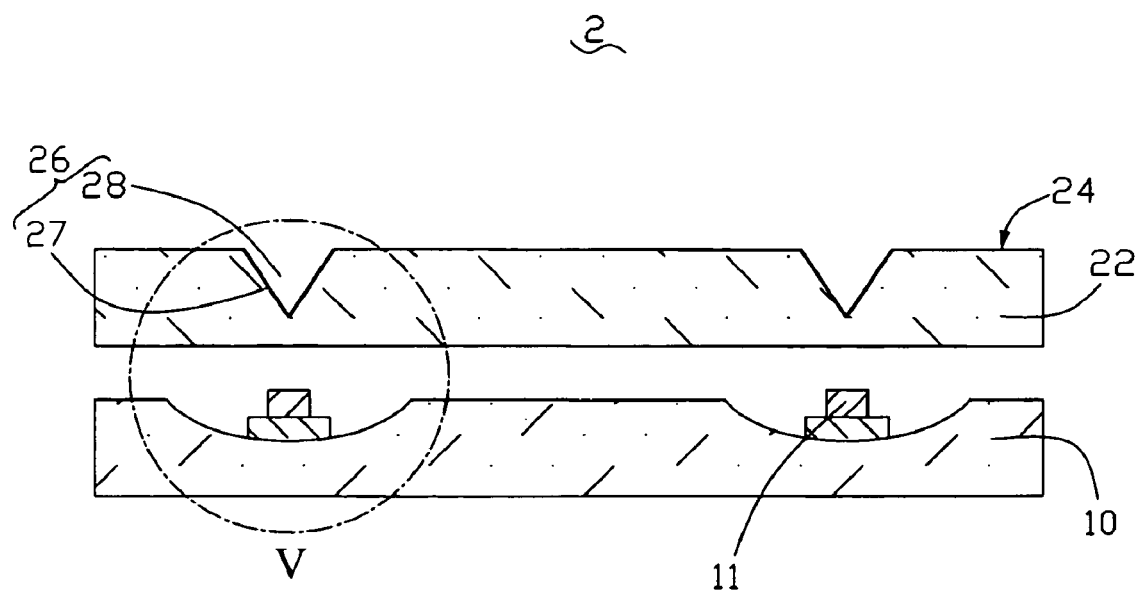
FIG. 4 is a schematic, cross-sectional view of a direct type backlight module in accordance with a second preferred embodiment.
Figure 5:
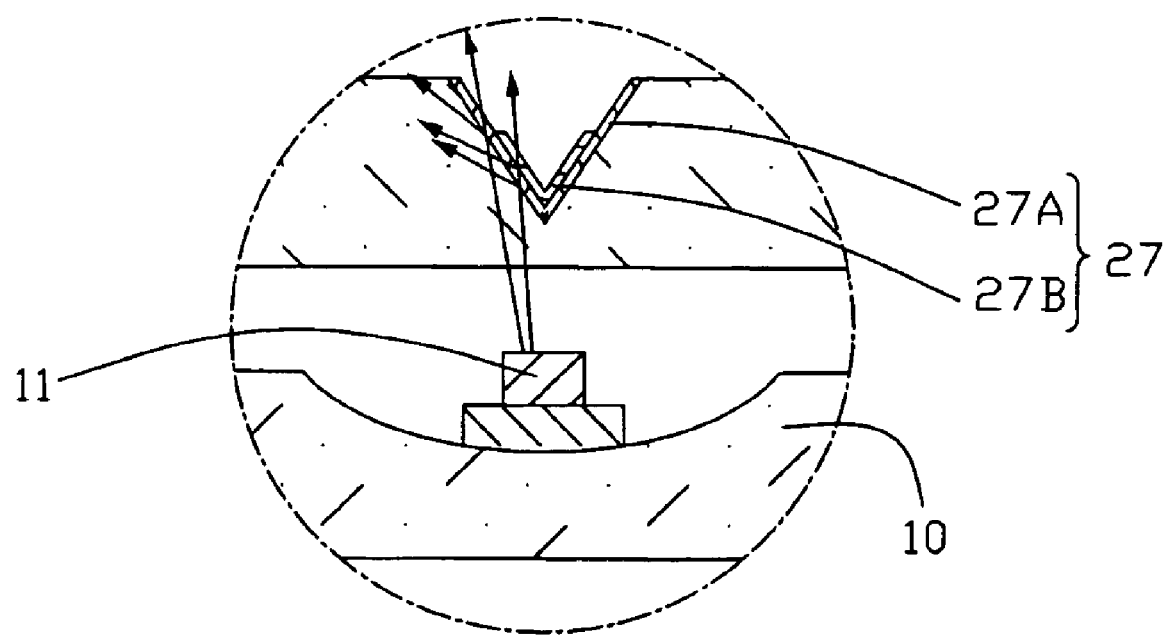
FIG. 5 is a schematic, enlarged view of a circled region V of the direct type backlight module of FIG. 4.

Referring to FIGS. 4 and 5, a direct type backlight module 2, in accordance with a second preferred embodiment is shown. The direct type backlight module 2 is similar to the first embodiment, except that at least one transflective unit 26 includes a recess 28 defined in the light guide plate 22 and at least one transflective layer 27 covering the recess 28. The at least one transflective layer 27 includes a first transflective layer 27A covering the recess 28 and a second transflective layer 27B covering part of the first transflective layer 27A. The recess 28 may have a tapered surface or a hemisoherical surface. The at least one transflective layer 27 is similar to the transflective layer 17 in the first preferred embodiment. In this embodiment, the first surface 24 is a light emitting surface. The at least one transflective unit 26 can also include a block instead of a recess 28.

Figure 6:
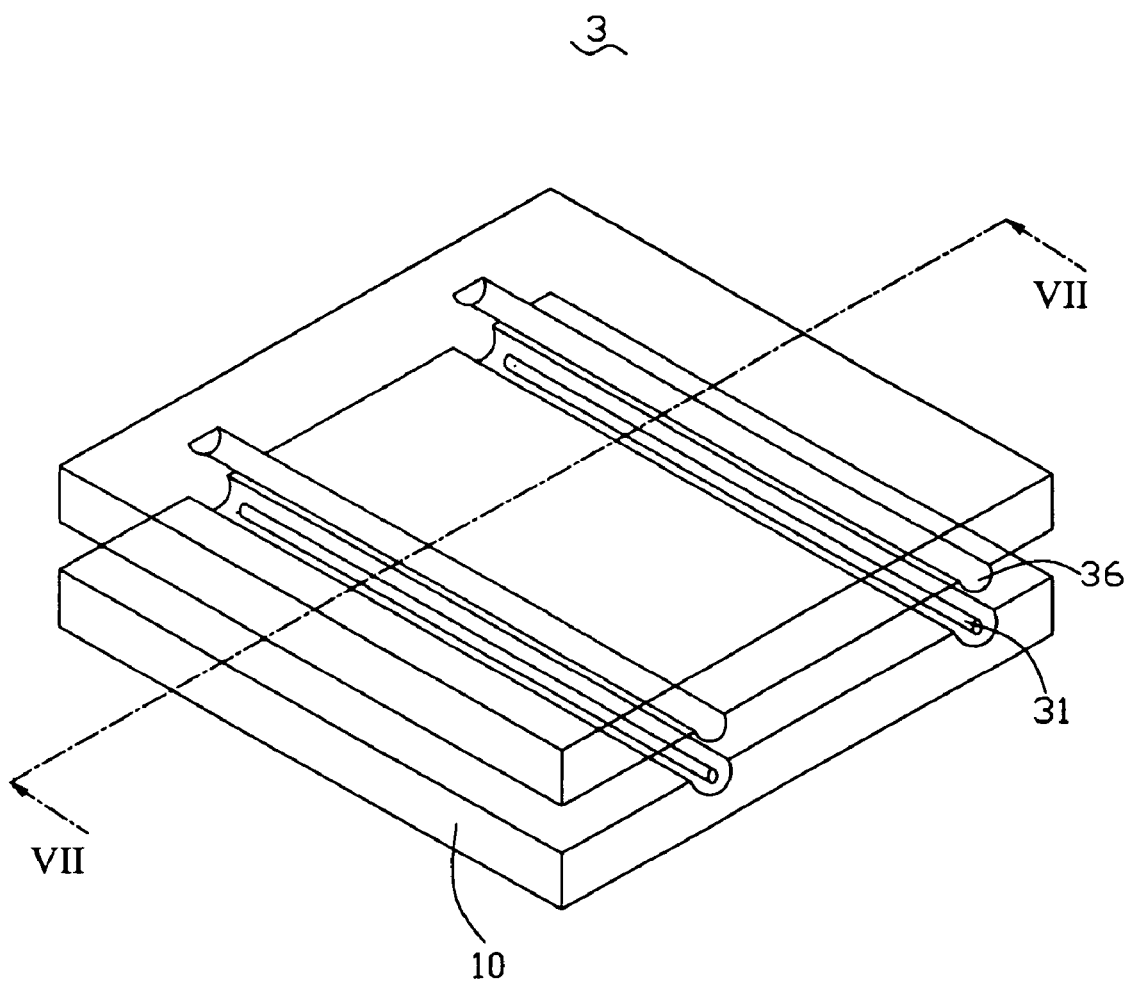
FIG. 6 is an isometric view of a direct type backlight module in accordance with a third preferred embodiment.
Figure 7:
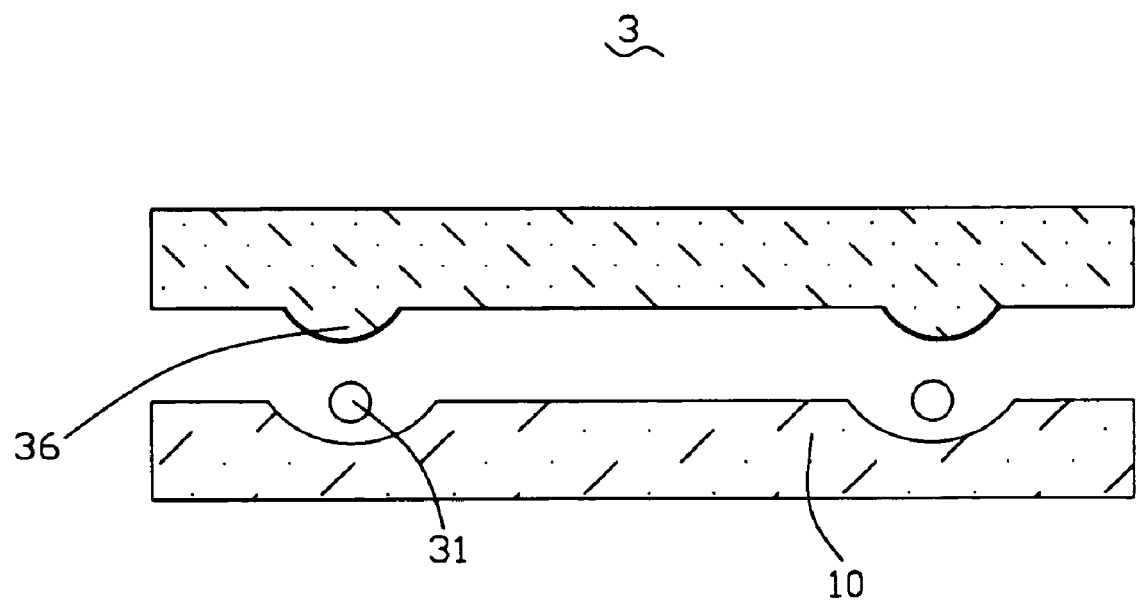
FIG. 7 is a schematic, cross-sectional view of the direct type backlight module of FIG. 6, taken along line VII-VII thereof.

Referring to FIGS. 6 and 7, a direct type backlight module 3, in accordance with a third preferred embodiment, is shown. The direct type backlight module 3 is similar to the first embodiment, except that at least one light source 31 is a cold cathode fluorescent lamp. The at least one transflective unit 36 includes a protrusion extending from the light guide plate and at least one transflective layer covering the protrusion. The cross section of the protrusion may be semicircular-shaped, V-shaped, etc. The at least one transflective layer is similar to the transflective layer 17 in the first preferred embodiment. The at least one transflective unit 36 may also include a groove instead of a protrusion. In this embodiment, the first surface is a light incident surface.

Figure 8:
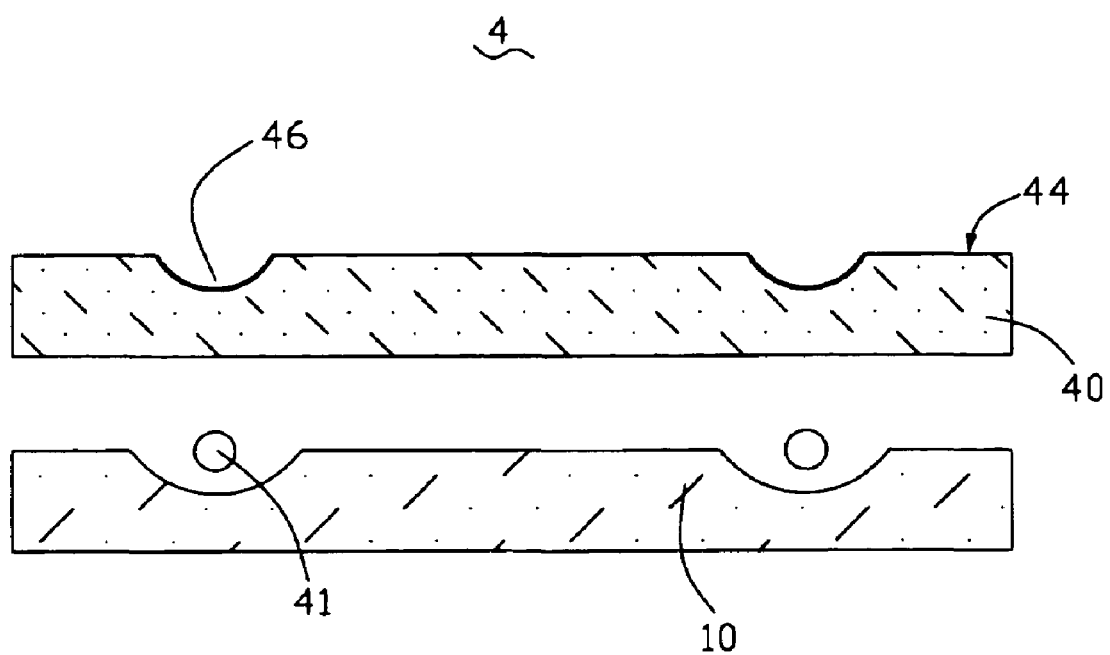
FIG. 8 is a schematic, cross-sectional view of a direct type backlight module in accordance with a fourth preferred embodiment.

Referring to FIG. 8, a direct type backlight module 4, in accordance with a fourth preferred embodiment, is shown. The direct type backlight module 4 is similar to the first embodiment, except that it includes at least one cold cathode fluorescent lamp as a light source 41, and at least one transflective unit 46 includes a groove and at least one transflective layer. The cross section of the groove may be semicircular-shaped, V-shaped, etc. The at least one transflective layer is similar to the transflective layer 17 in the first preferred embodiment. The at least one transflective unit 46 can also include a protrusion instead of a groove. In this embodiment, the first surface 44 is a light emitting surface of the light guide plate.

Figure 9:
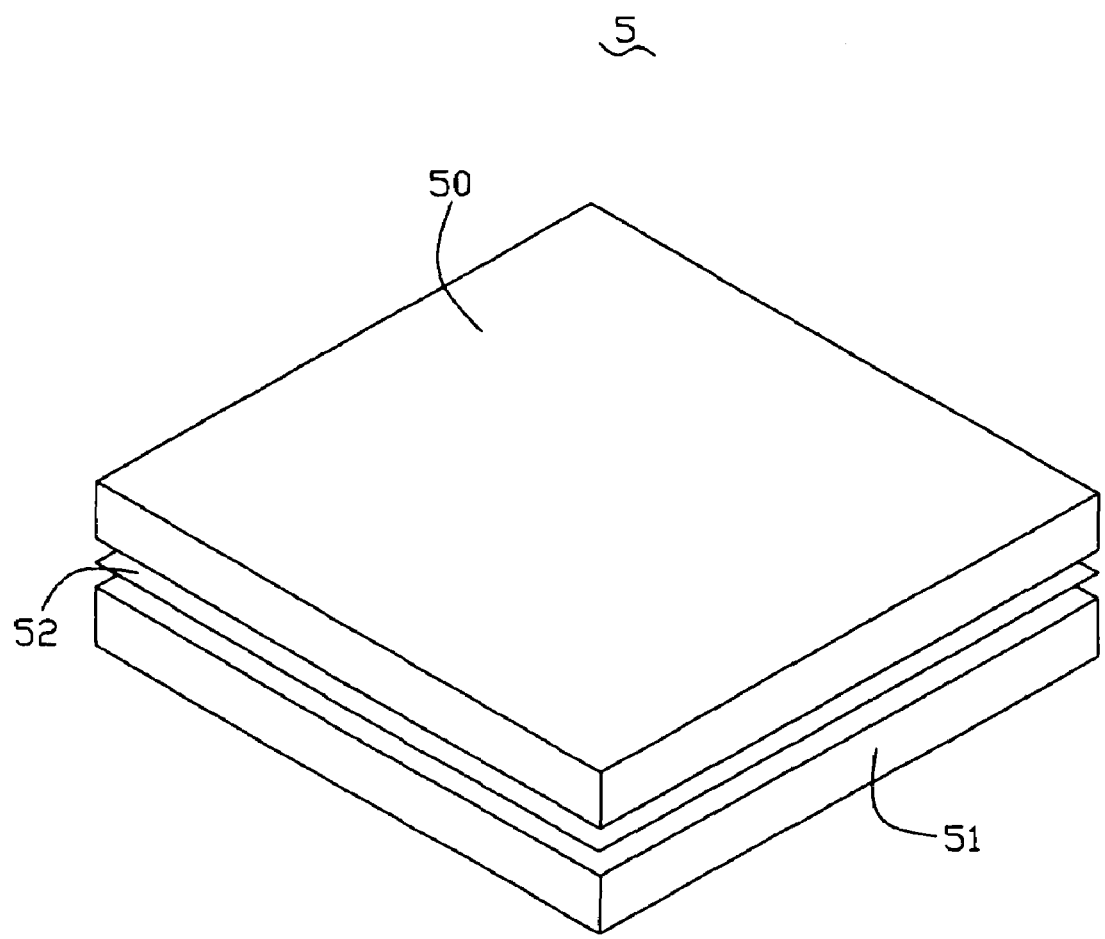
FIG. 9 is a isometric view of a liquid crystal display in accordance with a fifth preferred embodiment.

Referring to FIG. 9, a liquid crystal display 5, in accordance with a fifth preferred embodiment is shown. The liquid crystal display 5 includes a liquid crystal panel 50, a diffuser plate 52 arranged behind the liquid crystal panel 50, and a direct type backlight module 51 arranged behind the light guide plate 52. The direct type backlight module 51 can be any one of the direct type backlight modules as shown in FIG. 1, FIG. 4, FIG. 6, or FIG. 8.

It is to be understood that the above-described embodiment is intended to illustrate rather than limit the invention. Variations may be made to the embodiment without departing from the spirit of the invention as claimed. The above-described embodiments are intended to illustrate the scope of the invention and not restricted to the scope of the invention.

What is claimed is:

1. A direct type backlight module, comprising:
at least one light source for emitting light beams; and
a light guide plate having a first surface and a second surface at opposite sides thereof, and at least one transflective unit arranged on the first surface adjacent to the corresponding at least one light source, the at least one transflective unit comprising at least one transflective layer coated thereon, the at least one transflective layer having a reflective capability which gradually decreases in a direction away from the corresponding at least one light source, the at least one transflective unit being configured for reflecting a first part of the incident light beams, and allowing a second part of the incident light beams to pass therethrough.

2. The direct type backlight module as claimed in claim 1, wherein the at least one transflective layer is configured for reflecting the first part of the incident light beams and allowing the second part of the incident light beams to pass therethrough.

3. The direct type backlight module as claimed in claim 1, wherein the at least one transflective layer is made of a material selected from a group consisting of magnesium fluoride, titanium dioxide, tantalum oxide and silicon dioxide.

4. The direct type backlight module as claimed in claim 1, wherein the first surface of the light guide plate is selected from a group consisting of a light incident surface and a light emitting surface.

5. The direct type backlight module as claimed in claim 4, wherein the at least one transflective unit includes one of a black and a recess.

6. The direct type backlight module as claimed in claim 5, wherein the one of the block and the recess has a tapered surface, the tapered surface tapering in a direction toward the corresponding at least one light source.

7. The direct type backlight module as claimed in claim 1, wherein the one of the block and the recess has a hemispherical surface.

8. The direct type backlight module as claimed in claim 1, wherein the at least one light source is at least one light emitting diode.

9. The direct type backlight module as claimed in claim 1, wherein the at least one light source is at least one cold cathode fluorescent lamp.

10. The direct type backlight module as claimed in claim 9, wherein the at least one transflective unit includes one of a groove and a protrusion.

11. The direct type backlight module as claimed in claim 10, wherein a cross section of the one of the groove and the protrusion is one of V-shaped and semicircular-shaped.

12. The direct type backlight module as claimed in claim 1, further comprising a reflection plate arranged adjacent to the at least one light source, facing the light guide plate.

13. The direct type backlight module as claimed in claim 1, wherein each of the at least one transflective layer is configured for reflecting at least a part of the first part of the incident light beams, and allowing at least a part of the second part of the incident light beams to pass therethrough.

14. A liquid crystal display, comprising:
a liquid crystal display panel; and
a direct type backlight module arranged adjacent to the liquid crystal panel, the direct type backlight module comprising:
at least one light source for emitting light beams; and at least one light source for emitting light beams; and
a light guide plate having a first surface and a second surface at opposite sides thereof, and at least one transflective unit arranged on the first surface adjacent to the corresponding at least one light source, the at least one transflective unit comprising at least one transflective layer coated thereon, the at least one transflective layer having a reflective capability which gradually decreases in a direction away from the corresponding at least one light source, the at least one transflective unit being configured for reflecting a first part of the incident light beams, and allowing a second part of the incident light beams to pass therethrough.

15. The liquid crystal display as claimed in claim 14, wherein the at least one transflective layer is configured for reflecting the first part of the incident light beams and allowing the second part of the incident light beams to pass therethrough.

16. The liquid crystal display as claimed in claim 14, wherein each of the at least one transflective layer is configured for reflecting at least a part of the first part of the incident light beams, and allowing at least a part of the second part of the incident light beams to pass therethrough.

17. The liquid crystal display as claimed in claim 14, wherein the first surface of the light guide plate is selected from a group consisting of a light incident surface and a light emitting surface.

18. A direct type backlight module, comprising:
at least one light source for emitting light beams; and
a light guide plate having a first surface and a second surface at opposite sides thereof, and at least one transflective unit arranged on the first surface adjacent to the corresponding at least one light source, the first surface being selected from a group consisting of a light incident surface and a light emitting surface, the at least one transflective unit comprising one of a block and a recess, the one of the block and the recess having a tapered surface, the tapered surface tapering in a direction toward the corresponding at least one light source, the at least one transflective unit being configured for reflecting a first part of the incident light beams, and allowing a second part of the incident light beams to pass therethrough.

19. The direct type backlight module as claimed in claim 18, wherein the at least one transflective unit comprises at least one transflective layer coated thereon and being configured for reflecting the first part of the incident light beams, and allowing the second part of the incident light beams to pass therethrough.

20. The direct type backlight module as claimed in claim 18, wherein the at least one transflective layer has a reflective capability which gradually decreases in a direction away from the corresponding at least one light source.

* * * * *